Dec. 28, 1954  O. C. ECKEL  2,697,857

CLIP WITH LOCKING PLATE

Filed Oct. 11, 1946

INVENTOR.
Oliver C. Eckel
BY Harold E. Cole
Attorney

United States Patent Office 2,697,857
Patented Dec. 28, 1954

2,697,857
CLIP WITH LOCKING PLATE
Oliver C. Eckel, Belmont, Mass.

Application October 11, 1946, Serial No. 702,798

7 Claims. (Cl. 20—4)

This invention relates to clips with locking plates, and to a construction assembly that includes said clips. Said clips may be of the general construction shown in my Patent No. 2,389,965 issued November 27, 1945.

The principal object of my invention is to provide a clip and locking plate which will support and keep in place a layer of insulation or the like while getting another layer ready to put in place on the clip.

A further object is to provide such a clip and locking plate that are simple to manufacture and equally simple to affix in place when used.

Still another object is to provide a new construction assembly made possible by my clip and locking plate.

The foregoing and other objects which will appear as the nature of the invention is better understood, may be accomplished by a construction, combination and arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

As illustrated, my clip has a flat base 10 having perforations 11 therein. Two slits spaced apart are cut therein between which a portion of said base is forced outwardly to provide an offset portion 12. This leaves a space directly opposite said offset portion 12 to receive a tongue later described. When my clip is suspended from a wall or ceiling, cement or other adhesive is usually applied to said base 10 thus holding it to the wall or ceiling. Nails also may be used to hold it as said base 10 has holes 11 therein through which the nails pass.

Figure 4:
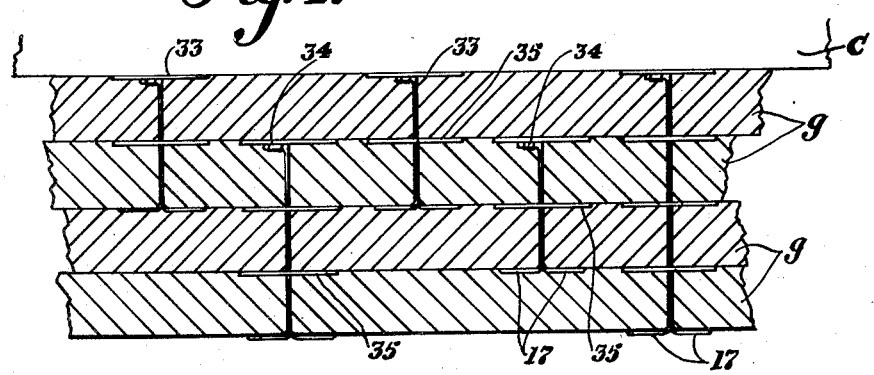
Figure 4 is a cross-sectional view of a construction assembly showing layers of insulation with my clips and locking plates holding said layers in assembled position.
Figure 5:
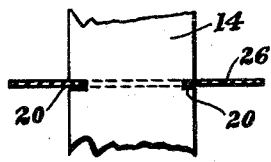
Figure 5 is a fragmentary, sectional view taken on the line 5—5 of Figure 2 showing a locking plate in locking position on the shank of a clip.

Attached to said base 10 is a shank 14 having at one extremity a tongue 15 extending at a right angle to the adjoining portion thereof. The other end of said shank 14 has a slot 16 extending down the center of the shank whereby fingers 17 are formed on each side thereof. Said slot 16 terminates in a larger opening 18 which is the point where said fingers 17 are bent over to hold insulation in place as illustrated in Figure 4 of the drawings.

Above said slot 16 notches 20 are made in the outer side extremities of said shank 14 which extend laterally inward, usually about 1/8 inch. Where one notch 20 is provided another directly opposite is preferably provided on the other outer side extremity.

For use in conjunction with my clip I provide a locking or supporting plate 25 which is preferably made of a square, flat piece of metal forming the body 26. It has a hole or opening 27 therein most of which is off-center. Said hole 27 has a slot-like portion 27a. The maximum length of said opening is its overall length, including said slot portion 27a, as defined by the border line 29 extending diagonally part way across said body. It is slightly longer than the width of said shank 14 to provide clearance so said shank 14 may pass through said opening 27 in said locking plate 25. The minimum length of said opening 27, defined by the short border line 30, is slightly more than the width of said shank 14 between two opposite said notches 20. Consequently when said locking plate 25 is moved to a position on said shank 14 opposite two said notches 20 said plate 25 is rotated until the portion of said shank 14 between two opposite notches 20 is in the said minimum length portion of said opening 27. In this position portions of said plate 25 rest upon and are supported by portions of said shank below said notches 20 hence said plate 25 cannot slide off said shank 14.

Where several layers of insulation are to be used, a number of clips may be secured to a ceiling or wall or other foundation, and a layer of insulation I is pushed over the shanks 14 of said clips, whereupon a locking plate is slipped onto each said shank and when it is alongside two opposite notches 20 said plate is rotated until the shank portion between said two notches fits into said minimum length of said hole 27. This locking plate 25 thus supports the insulation above it. Since a shank 14 may have a number of pairs of notches 20 other layers of insulation may be added, as desired, and locking plates 25 slipped onto said shanks 14 and into locking position, as explained.

Figure 1:
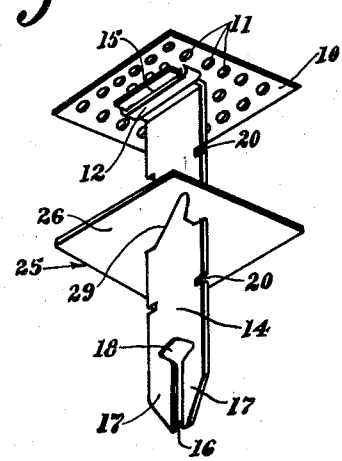
Figure 1 is a perspective view of my clip positioned as it appears when attached to a ceiling, showing a locking plate mounted thereon in locking position.
Figure 2:
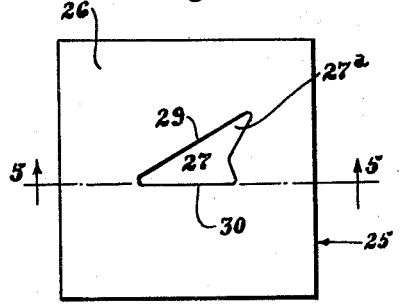
Figure 2 is a plan view of my locking plate.
Figure 3:
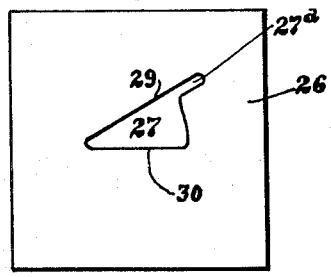
Figure 3 is a plan view of another form of my locking plate.

In Figure 3 of the drawings I show a locking plate having an opening 27 with a slot-like portion that is narrower than the one shown in Figure 2. It will also serve the same purpose as the locking plate shown in said Figure 2.

It should be noted that the line bounding said minimum hole length 30 is adjacent the central portion of said plate 25, so that the extremities of the minimum length portion of said opening will be spaced evenly from the four side edges of said body 26, hence said plate 25 will be centered on said clip shank 14 when in locked position.

In Figure 4 of the drawings I show an insulation assembly of several layers, some of which may be hard and some soft. Some of my clips 33 are attached at their base to a ceiling C and extend beyond said ceiling downwardly less than the full thickness of all the insulation layers I. Other of said clips 34 are inserted through a layer of insulation I, being spaced from said ceiling C. They hang down or extend beyond said insulation layer I to just beyond the lowest layer, with said shank fingers 17 being bent over to hold said insulation in place. Said locking plates 35 are attached to said shanks 14 as heretofore explained, thus holding in place each layer of insulation I as it is placed in position, except the lowest one, which is held by bending over said fingers 17. Since said clips 33 and 34 are commonly made of metal they are rapid conductors of heat and cold, which condition should be avoided between a ceiling or wall and the interior of the insulated room. Inasmuch as this assembly makes it possible to avoid having any clip extend from a ceiling, wall or the like to a point beyond the lowest or outermost layer of insulation the conduction of heat or cold by said clips may be avoided.

What I claim is:

1. A construction assembly formed of a plurality of headed clips embodying shanks, locking plates therefor, and a plurality of layers of insulation, one of said clips being attached by the head to a foundation and extending through a layer of said insulation nearest to said foundation, a locking plate attached to a said clip shank and supporting said layer, another said clip spaced from said foundation and having its head between said layer and the layer next below it the shank of which extends through said layer of insulation below said nearest layer, and a locking plate attached to said latter clip below said second layer.

2. A construction assembly formed of a plurality of headed clips embodying shanks having fingers at one end thereof and having a plurality of notches therein at each of two opposite outside edges spaced apart longitudinally and extending inwardly from said opposite outside edges thereof, locking plates mounted on said shanks each having an opening therein, and a plurality of layers of insulation the individual layers being of a thickness approximately equal to the distance between two of said adjoining notches at a said outside edge, said shanks extending through some of said insulation layers, said locking plates being mounted on said shanks between some two adjoining said layers of insulation and extending into said notches at said opposite outside edges, some of said clips being attached to a foundation the shanks of which are spaced from the outside of a said layer that is farthest from said foundation, and one of said clips being spaced from said foundation and having its head between two said layers the shank of which extends through said outside layer and the said fingers of which are bent laterally over and outside of said outside layer.

3. In combination, a construction clip embodying a shank, and a locking plate therefor, said locking plate comprising a body having an opening of generally triangular shape bounded by four distinct and straight border lines two of which adjoin and extend inwardly in angular relationship to each other between the other two and form one uneven side of said triangle, none of said border lines being parallel with any other, said shank having a notch therein extending laterally inward from an outer side thereof, the maximum length of said locking plate opening being greater than an unnotched width of said shank and the minimum length of said opening being in the intermediate portion thereof, said minimum length and the maximum length of the portion of the opening that is on the side thereof opposite said portion of maximum length being shorter than said unnotched width and longer than the width of said shank laterally opposite said notch.

4. In combination, a construction clip embodying a shank, and a locking plate therefor, said locking plate comprising a body having a non-circular opening therein having more than two border lines all of unequal length and including a relatively narrow, slot-like portion extending to one extremity of said opening, a part of the longest border line of said opening defining one side of said slot-like portion, another border line of said opening extending inwardly to form the opposite side of said slot-like portion, and a third said border line extending from the other said line outwardly, and a fourth said border line connecting with the latter and said longest line, said shank having a notch therein extending laterally inward from an outer side thereof, the maximum length of said locking plate opening being greater than an unnotched width of said shank and the minimum length of said opening being in the intermediate portion thereof, said minimum length and the maximum length of the portion of the opening that is on the side thereof opposite said portion of maximum length being shorter than said unnotched width and longer than the width of said shank laterally opposite said notch.

5. In combination, a construction clip embodying a shank, and a locking plate therefor, said locking plate comprising a body having a non-circular opening therein having four border lines all of unequal length and all extending at different angles with one another and including a slot-like portion extending to one extremity of said opening, a part of the longest border line of said opening defining one side of said slot-like portion, another border line of said opening extending inwardly in a non-parallel direction with said part to form the opposite side of said slot-like portion, and a third said border line extending outwardly from the other said line and being the shortest of all said lines, and a fourth said border line connecting with the latter and said longest line, said shank having a notch therein extending laterally inward from an outer side thereof, the maximum length of said locking plate opening being greater than an unnotched width of said shank and the minimum length of said opening being in the intermediate portion thereof, said minimum length and the maximum length of the portion of the opening that is on the side thereof opposite said portion of maximum length being shorter than said unnotched width and longer than the width of said shank laterally opposite said notch.

6. In combination, a construction clip embodying a shank, and a locking plate therefor, said locking plate comprising a body having a non-circular opening therein having more than two border lines and all unequal in length and including a relatively narrow slot-like portion extending to one extremity of said opening, a part of the longest said border line and the full length of the shortest said border line defining said slot, the latter said line extending inwardly, another said border line of said opening extending from the inner end extremity of said slot and in angular relationship thereto, and another said border line connecting with the latter border line, said shank having a notch therein extending laterally inward from an outer side thereof, the maximum length of said locking plate opening being greater than an unnotched width of said shank and the minimum length of said opening being in the intermediate portion thereof, said minimum length and the maximum length of the portion of the opening that is on the side thereof opposite said portion of maximum length being shorter than said unnotched width and longer than the width of said shank laterally opposite said notch.

7. In combination, a construction clip embodying a shank, and a locking plate therefor, said locking plate comprising a body having a non-circular opening therein having more than two border lines and all unequal in length and including a relatively narrow slot-like portion extending to one extremity of said opening, a part of the longest said border line and the full length of the shortest said border lines extending substantially parallel and defining said slot, the latter said line extending inwardly, another said border line of said opening extending from one end extremity of said slot and in angular relationship thereto, and another said border line connecting with the latter border line, said shank having a notch therein extending laterally inward from an outer side thereof, the maximum length of said locking plate opening being greater than an unnotched width of said shank and the minimum length of said opening being in the intermediate portion thereof, said minimum length and the maximum length of the portion of the opening that is on the side thereof opposite said portion of maximum length being shorter than said unnotched width and longer than the width of said shank laterally opposite said notch.

References Cited in the file of this patent

UNITED STATES PATENTS

| Number | Name | Date |
|---|---|---|
| D. 140,190 | Eckel | Jan. 30, 1945 |
| 422,250 | Pullin | Feb. 25, 1890 |
| 1,002,290 | MacGregor | Sept. 5, 1911 |
| 1,247,772 | Williamson | Nov. 27, 1917 |
| 1,251,772 | Guett | Jan. 1, 1918 |
| 1,287,679 | Hammond | Dec. 17, 1918 |
| 2,098,721 | Demarest | Nov. 9, 1937 |
| 2,235,530 | Mercer | Mar. 18, 1941 |
| 2,288,864 | Whitehead | July 7, 1942 |
| 2,442,064 | Veit | May 25, 1948 |

FOREIGN PATENTS

| Number | Country | Date |
|---|---|---|
| 56,102 | Austria | Nov. 11, 1912 |
| 270,451 | Germany | Feb. 14, 1914 |